Figure 4:
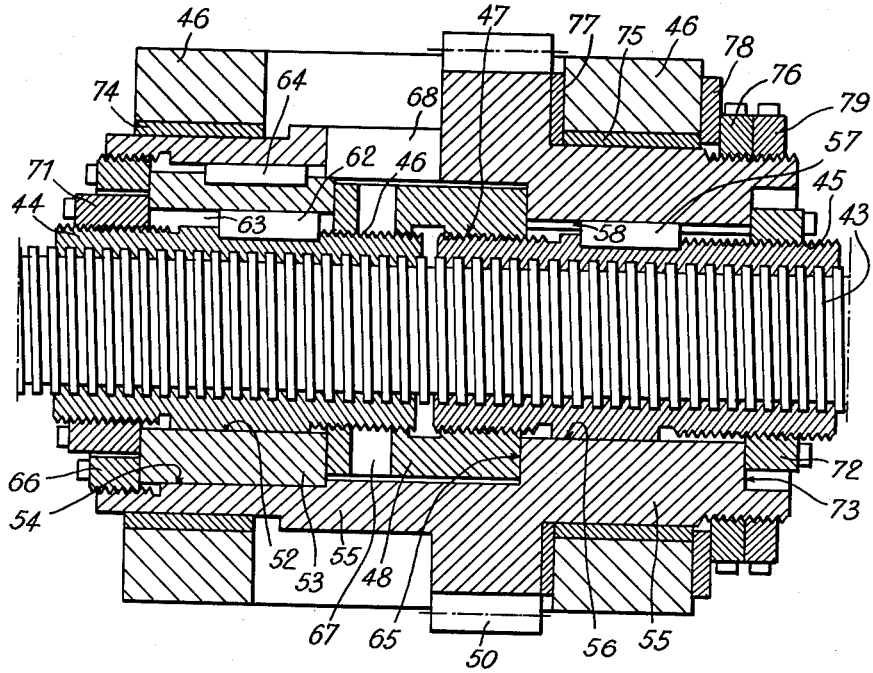

Feb. 14, 1956 R. G. CHAUVEL 2,734,394
FEED DRIVE MECHANISM WITH BACKLASH ELIMINATOR
Filed Aug. 19, 1954 2 Sheets-Sheet 1
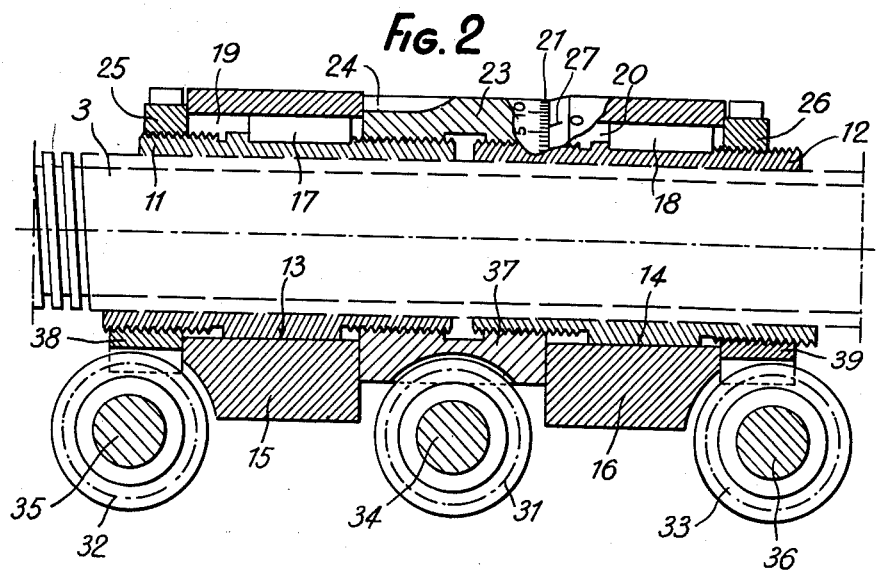
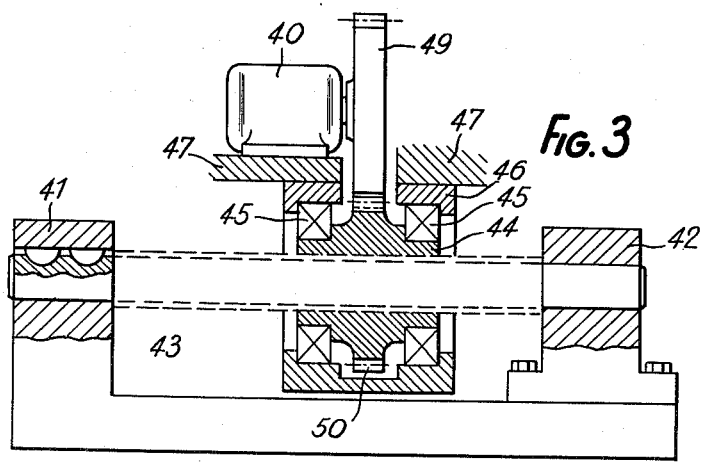
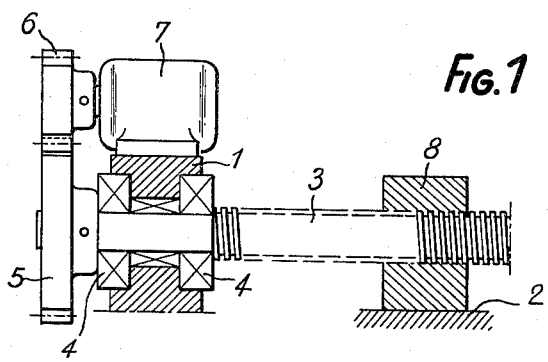
Inventor:
Raymond G. Chauvel
by J. Delater Lyny
Attorney Feb. 14, 1956   R. G. CHAUVEL   2,734,394
FEED DRIVE MECHANISM WITH BACKLASH ELIMINATOR
Filed Aug. 19, 1954   2 Sheets-Sheet 2

Inventor:
Raymond J. Chauvel
by, J. Delattre-Seguy
Attorney

United States Patent Office 2,734,394
Patented Feb. 14, 1956

2,734,394

FEED DRIVE MECHANISM WITH BACKLASH ELIMINATOR

Raymond G. Chauvel, Velizy, France, assignor to Societe a responsabilite limitee dite: Gambin & Cie., Billancourt, France Application August 19, 1954, Serial No. 450,941

Claims priority, application France August 21, 1953

14 Claims. (Cl. 74—441)

This invention relates to a device for traversing a machine member which is adapted to slide on another machine member, under the action of a screw-and-nut mechanism with backlash eliminator.

The invention more particularly relates to the devices of the type wherein the traversing nut is splitted into two parts which are adapted to be axially moved with respect to each other without any relative angular shifting movement thereof and provided with the threaded portions of different pitches in mesh with corresponding portions of a backlash eliminating nut.

Devices of this type are already known but they are not quite satisfactory because the two portions of the traversing nut are not both positively clamped within the machine member that supports them.

The object of this invention is to remove this drawback by providing a device wherein both parts of the traversing nut may be clamped in a perfect manner within the member that supports them through the agency of means adapted to be released when it is required for the backlash to be adjusted. A feed drive mechanism is thus obtained which is very accurate and which not only permits a complete elimination of any play but also comprises no members likely to introduce any error due to some distortion. Furthermore, the device is applicable to the rotary screw type as well as to the rotary nut type of feed drive mechanism.

According to the invention, the two portions of the traversing nut are splined in a part mounted in the machine member that carries them and clamping means are provided for making the two portions of the traversing nut rigid with said part.

Preferably, the threaded portions of different pitches are of the same hand in order to produce a precise differential adjusting effect.

According to a preferred embodiment, the means for clamping the two portions of the traversing nut are constituted for each of said portions, by the backlash eliminating nut and a clamping nut threaded upon the outer end of said portions whereby the two nuts clamp between themselves a part connected to the machine member which carries the traversing nut.

Figure 5:
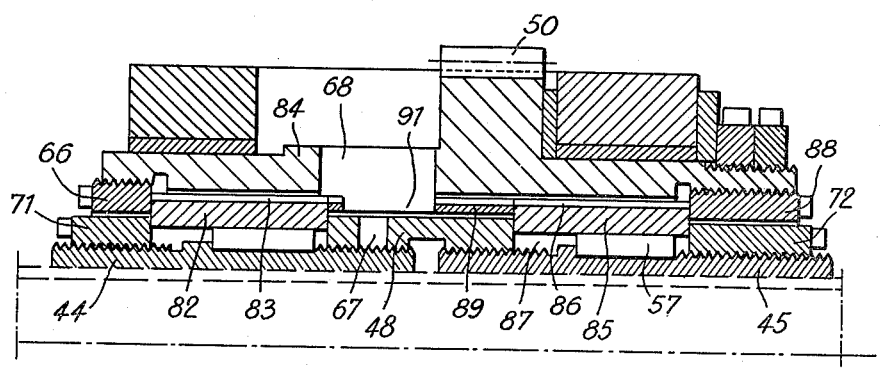

Other and further objects and advantages of the invention will be apparent to those skilled in the art, from a consideration of the following description of three specific embodiments of the invention, shown by way of examples, in the accompanying drawings in which:

Fig. 1 diagrammatically illustrates in axial section, a control system for traversing a machine member on another member by means of a device including a driving screw connected to one of said members and a nut secured in the other member;

Fig. 2 shows, in longitudinal section, one embodiment of the traversing nut illustrated in Fig. 1, according to the invention, whereby the upper portion of said Fig. 2 corresponds to one embodiment in which the adjustment is effected directly by hand, whereas the lower portion corresponds to one embodiment in which the adjustment is remotely effected;

Fig. 3 diagrammatically illustrates, in longitudinal section, a traversing mechanism similar to that shown in Fig. 1, but in which the screw is rigid with a member of the machine, whereas the nut is rotatably driven in the other member;

Fig. 4 illustrates, in longitudinal section, one embodiment of the rotary nut of Fig. 3 according to the invention; and Fig. 5 is a modification of the nut of Fig. 4.

Referring first to Fig. 1, it will be seen that a machine member 1, only one portion of which is visible in the drawing, is adapted to be moved to and fro on another machine member 2. To this aim, a control screw 3 is rotatably supported in the machine member 1, for instance by means of antifriction bearings 4, but is prevented against longitudinal movement relative to said machine member. The control screw is rotatably driven by any suitable device which, for the sake of simplification, has been diagrammatically illustrated in the drawing in the form of a pair of toothed wheels 5 and 6 rotated by an electric motor 7. The control screw 3 is in threaded engagement with a corresponding nut 8 rigid with the machine member 2. Such conventional feed and traversing drive ensures a relative shifting of the two machine members 1 and 2 under the action of a rotational movement being imparted to the screw 3. According to the needs of the application contemplated, and particularly according to the relative size of the two machine members 1, 2, either the machine member 1 will be stationary whereas the machine member 2 is movable on the member 1 or the arrangement is the reverse, i. e. the member 1 is movable on the member 2. In both cases, the operation of the feed drive by means of the screw 3 and the nut 8 is exactly the same. By way of example, one embodiment of a feed nut similar to the nut 8 in Fig. 1 will now be described.

To this aim, reference will now be made to Fig. 2 in which it will be seen that the feed nut (which corresponds to the nut 8 in Fig. 1) is made up of two parts 11 and 12 arranged near each other on the control screw 3 and housed in cylindrical bores 13, 14 respectively provided in parts 15, 16 which are rigid with the machine member in which the nut is mounted, namely the machine member identified by the reference numeral 2 in Fig. 1. The two halves 11 and 12 of the feed nut are adapted to longitudinally slide within the bores of the parts 15 and 16 while not being allowed to rotate with respect to said parts by virtue of the presence of keys 17, 18 which are rigid with the two halves of the feed nut and have a sliding fit in grooves 19, 20 cut in the two parts 15 and 16 respectively.

The adjacent end portions of the two halves 11, 12 of the feed nut are each formed with a screw thread of the same hand but of slightly different pitches which are in threaded engagement with corresponding inner threaded portions of an adjusting nut 23. Notches 24 are cut out in the periphery of the nut 23 in order to make it possible to insert a tool in said notches for rotating the nut. The adjusting nut 23 is longitudinally positioned between the two opposite faces of the parts 15, 16 and the spacing of which is a strictly equal to the length of the adjusting nut 23. The two parts 11 and 12 of the feed nut are firmly clamped in the parts 15 and 16 respectively by means of castellated locking nuts 25, 26 which are threadedly engaged on the outer ends of the two parts of the feed nut and which bear on the parts 15 and 16.

The operation of this device will now be explained taking into consideration the upper half of the figure only, since the lower half thereof includes a slight modification in connection with the manner for driving the adjusting and locking nuts upon which it will be reverted to further on. Either, at the moment of assembly, or also in order to eliminate some backlash due to wear, the procedure is as follows:

The locking nuts 25, 26 are released for permitting a slight longitudinal sliding movement of the two parts 11, 12 of the feed nut under the action of a rotational movement of the adjusting nut 23 in the suitable direction. As a result, the two parts of the feed nut are moved toward or away from each other, and since they are not allowed to rotate one with respect to the other due to the presence of the sliding keys 17, 18, it is readily understood that the play or backlash between the screw 3 and the two-part feed nut may be entirely eliminated. This adjustment may be carried out in a very precise manner, because the two threads in the adjusting nut are of the same hand, and therefore, produce a differential relative shifting movement of the two parts of the feed nut. The smaller the difference between the pitches, the greater the accuracy of the adjustment will be. After the adjustment has been properly effected, the locking nuts 25 and 26 are again tightened. In this manner, the two parts 11 and 12 of the feed nut are firmly clamped against the parts 15 and 16 and, therefore, no play is to be feared in the connection between the feed nut and the machine member which carries it. Furthermore, it is possible to eliminate the backlash without tentative trials, if care has been taken to provide on the adjusting nut 23 calibrations 21 adapted to cooperate with an index 27 carried by the part 16. Actually, it is possible to read on a graduated drum rigid with the screw the amount of play between the feed screw and nut, and in order to eliminate the corresponding backlash it is sufficient to rotate the nut 23 a corresponding angle with the aid of the graduation opposite the index 27.

It has been assumed, so far, that in order to effect the adjustment, the adjusting and locking nuts were directly acted upon. In some machine designs, however, it may happen that said nuts cannot be reached, and in such cases, use may be made of a remote control for instance of the type illustrated in the lower part of Fig. 2.

In this figure three worms 31, 32 and 33 respectively fixed on control spindles 34, 35 and 36 are mounted for rotation in the machine member that carries the feed nut, said worms being respectively in mesh with the adjusting nut 37 and the locking nuts 38 and 39 formed on their outer peripheries with helical toothings in mesh with said worms. The operation of this device is exactly the same as that of the device previously described, the only difference lying in the fact that the adjusting nut and the locking nuts, instead of being acted upon directly by hand, are controlled through the medium of the spindles which carry the worms in mesh with said nuts.

The device which has just been described, either directly or remotely controlled, is applicable in the case when the feed screw rotates in a machine member while the nut 11, 12 is rigid with the other member. Another embodiment will now be described of a screw and nut feed control device according to the invention but in which the screw is now rigid with one of the machine members while the feed nut is rotatably mounted within the other machine member which is to be moved to and fro with respect to said first member. This arrangement corresponds to the diagrammatical illustration of Fig. 3 which shows a machine member 41 propided with a detachable support 42 in which a feed screw 43 is rigidly secured while the feed nut 44 is mounted for rotation, for instance by means of antifriction bearings 45 in a splitted casing 46 fixed with respect to the other machine member 47 which is to be shifted with respect to the member 42. The rotational movement of the rotary nut 44 necessary for obtaining the relative reciprocatory movement of the members 42 and 47 is diagrammatically obtained in the drawing, from a motor 40 which drives a toothed wheel 49 in mesh with teeth 50 cut in the outer peripheral portion of the rotary nut 44. Here again, as is the case in Fig. 3, according to the size of the parts or according to the design of the machine, it is the member 42 that is stationary and the member 47 movable, or vice versa.

Fig. 4 illustrates one embodiment of a control device for a rotary nut as diagrammatically represented in Fig. 3. In said Fig. 4 are again shown the stationary traversing screw 43 and the traversing nut which, according to the invention, as in the device of Fig. 2 is comprised of two parts 44 and 45 arranged one beside the other on the screw 43. The adjacent end portions of the two parts 44 and 45 of the traversing nut are respectively formed with screw threads 46 and 47 of the same hand and of different pitches in mesh with corresponding threads of an adjusting nut 48. The two parts 44 and 45 of the traversing nut are respectively housed, the first in a bore 52 of a ring 53 which in its turn is housed in a bore 54 of a hub 55 of a toothed pinion 50, and the second, in a bore 56 of the hub of the same pinion. The portion 45 of the traversing nut is held against rotation within the hub 55 by a sliding key 57 which is rigid with the nut 45 and has a sliding fit in the keyway 58 of the hub 55. The portion 44 of the traversing nut is also held against rotation in the hub 55 by means of a key 62 which is rigid with the nut 44 and has a sliding fit in a keyway 63 of the ring 53, the latter, in its turn, being held against rotation in the hub 55 by means of a key 64.

The adjusting nut 48 is longitudinally positioned within the hub 55 between a face 65 of said hub and the inner face of the ring 53 urged toward the face 65 of the hub 55 by a locking nut 66 which is threadedly engaged in an inner screw thread formed in the adjacent end of the hub 55. The nut 66 thus makes it possible, through the medium of the ring 53, to lock the adjusting nut 48. The latter is provided with radial holes 67 for seizing and rotating it with respect to the hub 55. An opening 68 extending along a given arc is cut out through the hub 55 opposite the holes 67 to permit reaching said holes with a view to effect the adjustment. Finally, the two parts 44 and 45 of the traversing nut are securely immobilized within the hub 55 by means of locking nuts 71 and 72 threadedly engaged respectively on the outer end portions of the traversing nut and which bear, the first, against the outer face of the ring 53, and the second, against a shoulder 73 of the hub 55.

It will be seen that the pinion 50 corresponds to that which is represented in Fig. 3. It is rotatably mounted in the case 46 through the agency of plain bushings 74 and 75, and the lateral play of the assembly of the rotary nut is adjusted by means of the nut 76 threadedly engaged upon one end of the hub 55. Plain or antifriction end bearings are provided at 77 and 78. A safety nut 79 is used for locking the nut 76.

The operation of the device which has just been described is the following:

As in the embodiment previously described, when it is desired to modify the adjustment of the play between the two parts of the traversing nut on one hand, and the screw on the other hand, it is sufficient to act upon the adjusting nut 48 after the latter has been released. For this purpose, the nut 66 is first slightly unclamped in order to allow a smooth sliding movement of the adjusting nut 48, the locking nuts 71 and 72 are then released by an amount sufficient to permit a slight relative axial shifting movement of the two parts of the traversing nut, and the adjusting nut 48 is rotated by means of the holes 67 into which a spindle, for instance, may be introduced through the opening of the hub 55. As in the preceding embodiment, use may be made for instance, of a graduation on the nut 48 in cooperation with a reference mark engraved in the wall of the opening 68, in order to achieve, without any tentative trials, a complete backlash elimination. After this operation is completed, the three locking nuts 66, 71 and 72 are then tightened again in order to make the two parts 44 and 45 perfectly rigid with the hub of the driving pinion.

A modification of the device shown in Fig. 4 is illustrated in Fig. 5 and differs therefrom only by some details. In particular, it will be noted that in the preceding embodiment the groove in which the key 64 is housed (Fig. 4) could be obtained in the part 55 by a machining operation in a slotting machine, whereby the tool could be cleared into the opening 68 upon each stroke, but according to a technique which has been found reliable, it is often preferred, instead of a key, to use a splined connection, the side faces of the splines being either rectilinear or preferably in the shape of an involute. It is this solution that has been adopted in the embodiment shown in Fig. 5 where it will be seen that the ring 82 is formed on its outer surface with splines 83 in mesh with complementary splines provided in the bore of the hub 84 of the toothed pinion 50. Said splines are machined in the hub 84 by means of a broaching operation and since the broach has to be driven throughout the part, this solution made it necessary to omit the shoulders 65 and 73 in the hub 55 in the embodiment shown in Fig. 4 and to provide an additional ring 85, identical with the ring 82 and also formed on its outer surface with splines or serrations 86 in mesh with the splines 83 which extend in the hub 55 throughout the length thereof. The ring 86 is provided with a keyway 87 adapted to receive the key 57 of the traversing nut 85. In order to longitudinally position the ring 85, provision is made for an additional locking nut 88 similar to the locking nut 66 and threadedly engaged in the adjacent end portion of the hub 84. The locking nut 72 bears against one end of the ring 85 rather than against the face 73 of the hub 55 in the embodiment of Fig. 4.

The embodiment of Fig. 5 has a further difference with respect to that of Fig. 4, namely an additional ring 89 which surrounds the adjusting nut 48. The length of said ring is practically equal to that of the adjusting nut 48, it is, however, ground on both end faces thereof to a size which is in excess of that of the nut 48 by 1 or 2 hundredths of a millimeter. Owing to this design, when it is desired to carry out the adjustment, after all under the same conditions, as in the preceding embodiment, it is not necessary to release the two nuts 66 and 88 in order to rotate the nut 48, because this difference of 1 or 2/100 of a mm. is sufficient for not preventing the adjusting nut 48 to be rotated while maintaining it slightly in engagement with a sliding fit against the two rings 82 and 85. Of course, an opening 91 is provided through the ring 89 opposite the opening 68 of the hub 84, in order to permit reaching the holes 67 intended to receive the spindle which is used for rotating the adjusting nut 48. When it is desired to adjust the backlash, therefore, it is sufficient in principle to release only the two nuts 71 and 72.

It will be seen that the device for traversing a machine member on another, by means of a screw-and-nut device incorporating a backlash eliminator, according to the invention, some embodiments of which have just been described by way of examples, may be applied in every instance where it is required to move a machine member along rectilinear slideways in a very accurate and reliable manner. Particularly, this device may be advantageously applied to the traversing of machine-tool carriages in which the plays are highly detrimental to the finish of the workpiece and which are to be quickly reversed with a strict timing control of the movements thereof with respect to the drive member, as is the case in the milling and cutting (gear cutting for instance) operations, particularly when using down-milling and copy-milling.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

What I claim is:

1. Feed drive mechanism for traversing a machine member on another machine member comprising in combination two cooperating traversing elements namely a traversing screw and a traversing nut threadedly engaged with each other, one of said two traversing elements being rigid with one of said machine members while the other of said traversing elements is rotatably mounted in said other machine member and longitudinally positioned with respect thereto, said traversing nut being split into two parts which are arranged one behind the other on said traversing screw and which are longitudinally splined in a part mounted in said machine member that carries said traversing nut, said two parts of said traversing nut being formed with outer screw threads of different pitches, the combination further comprising a backlash eliminating nut formed with two inner screw threads adapted to cooperate simultaneously with said two outer screw threads of said traversing nut, and clamping means adapted to firmly hold said both parts of said traversing nut with respect to said traversing nut carrying part.

2. Feed drive mechanism according to claim 1, wherein said two screw threads of different pitches are of the same hand in order to create an accurate differential adjusting action.

3. Feed drive mechanism according to claim 1, wherein said both parts of said traversing nut are arranged close to each other while said backlash eliminating nut is mounted upon the two adjacent end portions of both parts of said traversing nut.

4. Feed drive mechanism according to claim 1, wherein said both parts of said traversing nut are arranged close to each other while said backlash eliminating nut is mounted upon the two adjacent end portions of both parts of said traversing nut, said clamping means for clamping said both parts of said traversing nut being constituted for each of said parts by said backlash eliminating nut and a locking nut threadedly engaged on the outer end of said part, whereby a portion of said traversing nut carrying part is adapted to be clamped between said backlash eliminating nut and said locking nut.

5. Feed drive mechanism according to claim 1, wherein said both parts of said traversing nut are arranged close to each other while said backlash eliminating nut is mounted upon the two adjacent end portions of both parts of said traversing nut, said clamping means for clamping said both parts of said traversing nut being constituted for each of said parts by said backlash eliminating nut and a locking nut threadedly engaged on the outer end of said part, whereby a portion of said traversing nut carrying part is adapted to be clamped between said backlash eliminating nut and said locking nut, an intermediate ring being inserted between said traversing nut and said locking nut.

6. Feed drive mechanism according to claim 1, wherein said both parts of said traversing nut are arranged close to each other while said backlash eliminating nut is mounted upon the two adjacent end portions of both parts of said traversing nut, said clamping means for clamping said both parts of said traversing nut being constituted for each of said parts by said backlash eliminating nut and a locking nut threadedly engaged on the outer end of said part, whereby a portion of said traversing nut carrying part is adapted to be clamped between said backlash eliminating nut and said locking nut, an intermediate ring being inserted between said traversing nut and said locking nut, the connection between said traversing nut carrying part and said intermediate ring being ensured by two assembling nuts threadedly engaged within said traversing nut carrying part and bearing respectively against the outer end face of said intermediate rings.

7. Feed drive mechanism according to claim 1, wherein said both parts of said traversing nut are arranged close to each other while said backlash eliminating nut is mounted upon the two adjacent end portions of both parts of said traversing nut, said clamping means for clamping said both parts of said traversing nut being constituted for each of said parts by said backlash eliminating nut and a locking nut threadedly engaged on the outer end of said part, whereby a portion of said traversing nut carrying part is adapted to be clamped between said backlash eliminating nut and said locking nut, an intermediate ring being inserted between said traversing nut and said locking nut, the connection between said traversing nut carrying part and said intermediate ring being ensured on one hand, by longitudinal splines and on the other hand, by two assembling nuts threadedly engaged within said traversing nut carrying part and bearing against the outer end face of said intermediate rings.

8. Feed drive mechanism according to claim 1, wherein the outer peripheral face of said backlash eliminating nut is cut into worm-wheel teeth, and a manually operable control worm is in mesh with said worm-wheel teeth of said backlash eliminating nut.

9. Feed drive mechanism according to claim 1, wherein the outer peripheral face of said locking nuts are cut into worm-wheel teeth, and manually operable control worms are respectively in mesh with said worm-wheel teeth of said locking nuts.

10. Feed drive mechanism according to claim 1, wherein said backlash eliminating nut is provided with a graduation on the outer peripheral face thereof, and the machine member in which said backlash eliminating nut is mounted is provided with an index datum mark adjacent said graduation.

11. Feed drive mechanism according to claim 1, wherein said traversing screw is rotatably mounted in the machine member that carries it, while said traversing nut is rigid with said other machine member.

12. Feed drive mechanism according to claim 1, wherein said traversing screw is rigid with said machine member that carries it, while said traversing nut is rotatably mounted in said other machine member.

13. Feed drive mechanism according to claim 7, wherein an additional intermediate ring having the same length as said backlash eliminating nut surrounds the latter and is in bearing engagement endwise with said first intermediate rings.

14. Feed drive mechanism according to claim 1, wherein said traversing screw is rigid with said machine member that carries it, while said traversing nut is rotatably mounted in said other machine member, an opening being provided in said traversing nut carrying part in order to provide access to said backlash eliminating nut.

References Cited in the file of this patent
UNITED STATES PATENTS
2,119,705    De Vlieg ---------------- June 7, 1938